EFFECT OF CATIONIC GROUPS

EFFECT OF MOLECULAR WEIGHT

United States Patent Office 3,655,814
Patented Apr. 11, 1972

3,655,814
VISCOELASTIC CATIONIC POLYMERS CONTAINING THE URETHANE LINKAGE
Alan Rembaum, Altadena, Calif., assignor to California Institute of Technology, Pasadena, Calif.
Filed May 19, 1969, Ser. No. 825,489
Int. Cl. C08g 22/04
U.S. Cl. 260—77.5 Q
11 Claims

ABSTRACT OF THE DISCLOSURE

A viscoelastic cationic polymer having a repeating unit of the formula:

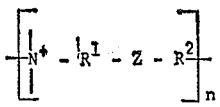

where Z is a linking condensation residue, preferably urethane and n is an integer prepared by linking reactions between monomeric starting materials including quaternary nitrogen forming coreactants and condensation residue forming coreactants.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

(1) Field of the invention

The present invention relates generally to cationic polymers and to methods of polymerizing novel monomeric mixtures. More particularly this invention relates to linear and cross-linked cationic viscoelastic polymers.

(2) Description of the prior art

Elastomeric cationic materials will find many uses. The presence of cationic moieties in the backbone will provide a product of increased conductivity which can be further enhanced by complexing the cationic centers with charge-transfer complexing agents. Materials having conductivity within the semi-conductor range can be used in printed circuits and other electronic devices. Films of these materials would find application in forming charged master plates for graphic reproduction and ultimately for photocopying. Conductive viscoelastic rubbers would likewise find application in electrostatic precipitation devices, dust collectors, corona-discharge shields and the like. Furthermore, positive quaternary charges are usually associated with bacteriostatic antiparasitic and fungicidal activity. Therefore, surgical gloves formed of materials having these properties would be inherently germicidal as well as resistant to build up the static electrical charges.

Most of the previously described cationic polymers have been found to be highly crystalline and the glass transition temperature range too narrow to provide significant damping characteristics. Furthermore, both the mechanical strength and the elasticity has not been high enough to provide elastomeric products having commercially interesting properties.

In application, Ser. No. 678,501, filed Oct. 27, 1967, now abandoned, a synthesis of cationic polyelectrolytes containing quaternary nitrogen centers in the backbone of the polymer chain is disclosed. These polyelectrolytes are prepared by reacting a ditertiary amine with a dihalo organic compound. Linear polymers of widely varying properties were obtained. In accordance with the invention, the elastomeric and polyelectrolytic properties of the final polymer are substantially controlled and modified by utilizing much higher molecular weight starting materials prepared by prepolymer condensation processes.

OBJECTS AND SUMMARY OF THE INVENTION

It is therefore an object of the invention to provide a new family of viscoelastic materials.

Still a further object is to provide synthesis and manufacture of elastomeric compositions and articles containing quaternary nitrogen centers and condensation residues along the polymeric backbone thereof.

Yet another object of the invention is the provision of linear and cross-linked straight chain and block polymers having a wide damping temperature range.

Yet another object of the invention is the provision of linear and cross-linked cationic polymers having enhanced electrical conductivity when complexed by charge-transfer complexing agents.

These and other objects and many attendant advantages of the invention will become apparent as the description proceeds.

The viscoelastic cationic polymers according to the invention are selected from polymers having a repeating unit of the formula:

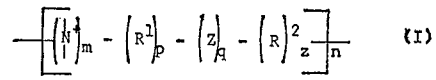 (I)

where $R^1$ and $R^2$ are organic radicals such as hydrocarbyl, Z is a linking condensation residue, $m$, $p$, $q$, and $z$ are integers from 1 to 10,000 and $n$ is an integer of sufficient magnitude to provide a final solid polymer. The backbone of the repeating unit contains at least one condensation residue and at least one quaternary nitrogen atom separated and joined by organic radicals.

Polymers of Formula I are prepared by reacting a compound selected from those of the formulae:

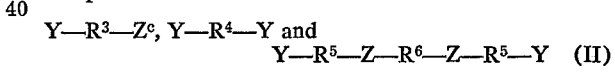

with a compound selected from those of the formulae:

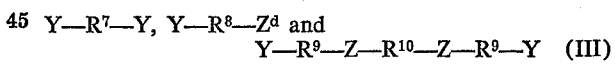

where $R^3$–$R^{10}$ are organic radicals such as hydrocarbyl, Y is a quaternary forming moiety such as tertiary nitrogen or halo and $Z^c$ and $Z^d$ are coreactive condensible moieties such as hydroxy and isocyanate urethane forming groups. At least one of compounds II or III contains a Z residue or the II–III pair contains $Z^c$ and $Z^d$ residue forming moieties.

The linking structure Z may suitably be a urethane, amide, imide, ester, or urea. Urethane linkages are preferred because of the ready availability of diverse isocyanate materials, the absence of elimination products and the ability to select and control the properties of the final prepolymer. Therefore $Z^c$ and $Z^d$ can be selected from hydroxyl, amino, carboxyl, anhydride or isocyanate.

Compounds Y—$R^4$—$Y^{(II)}$ and Y—$R^7$—$Y^{(III)}$ may be a ditertiary amine material and a dihalo material. $R^4$ and $R^7$ contain at least two carbon atoms and may be of polymeric or prepolymeric length. Exemplary dihalo compounds are α (alpha), Ω (omega) alkyl or alkenyl bromides containing at least two carbon atoms. Suitably, the bromide may be a terminal dibrominated aliphatic such as dibromoethane, dibromopropane, dibromobutane, dibromobutene, dibromohexane, dibromodecane, and similar homologs through dibromohexadeecane. Dibromoaromatics or alkylated aromatics such as dibromoxylene are also suitable. Polymers may also be formed with corresponding dichloro- and diodo-compounds. Terminal brominated polymers such as polybutadienes containing from about 20 to about 500 or more carbon atoms can also be utilized to form polymers according to the invention. As the number of carbon atoms increases, rubbery products are favored.

Exemplary ditertiary amines are N,N,N',N'-tetramethylhexamethylenediamine, N,N,N',N' - tetramethyldecamethylenediamine, 1,2-bis-(4-pyridyl)-ethane, 1,2-bis-(2-pyridyl)-ethane, 1,2-bis-(4-pyridyl)-ethene, and N,N,N', N'-di-(4 - benzylamino)ethane, tetramethylaminobenzophenone or diazine. Other di-tertiary compounds may be formed from heterocyclic compounds such as piperidine, picoline, quinoline, acridine, or phenanthridine. The amine may also be of polymer length. For example, an isocyanate terminated polybutadiene containing 20 to 200 or more carbon atoms may be reacted with two moles of a hydroxyalkyl substituted tertiary amine such as dimethylamino hydroxyethanol which will link to the polybutadiene to form a long chain di-tertiary amine. Other suitable compounds of Formula II are bromobutanol, 1-bromo, 6-cyanato hexane, bis-1,3-dimethylamino-2-propanol or 2-dimethylaminoethanol.

The butadiene polymers utilized in the process of the invention such as the dibromo or the diisocyanate polymers discussed above should contain a minimum amount, suitably below 40%, of 1,2-addition units to avoid excessive decrease in elastomeric properties. Such polybutadienes are available as liquid polymers having a molecular weight from 2,000 to 10,000. A suitable material, Polysar-rubber (Polysar Limited) is a brominated liquid polybutadiene having a molecular weight of about 5,000 and a functionality very near to two. Another suitable material is HYSTL polybutadiene (HYSTL Development Company, a subsidiary of TRW Inc., and Cores Inc.).

As discussed above at least one of the monomers is prepared as a condensation prepolymer, and preferably is based on a urethane forming reaction. For example, a polyisocyanate reacted with a tertiary amino alcohol will form a polytertiary amine of the formula:

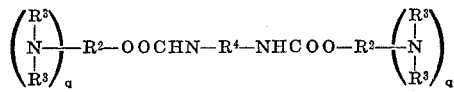

where $R^3$ is lower alkyl, $R^2$ is lower alkyl, $R^4$ is selected from phenyl, polyphenyl, polyoxyethylene, or alkyl of 4–20 carbon atoms and $q$ is 1 or 2.

Reaction of the polytertiary amine where $q$ is 1 with a dibromopolybutadiene will form a linear polymer of the formula:

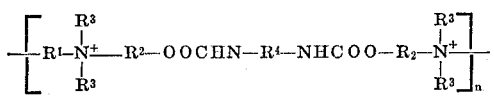

where $R^1$ is a polybutadiene having a molecular weight from 1,000 to 10,000 and $n$ is an integer from 2 to 500. When the alcohol contains more than one di-tertiary amino group, the corresponding reaction product will contain amino groups in excess of the number necessary to form a linear polymer and these pendant groups would be available for cross linking the polymer of the general formula:

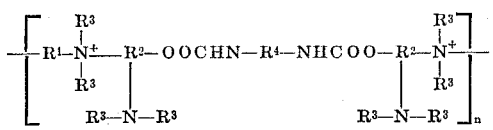

where $n$, $R^1$, $R^2$, $R^3$ and $R^4$ have the above meanings. For example, the reaction of bis-1,3-(dimethylamino)-2-propanol and hexamethylene diisocyanate is illustrated below:

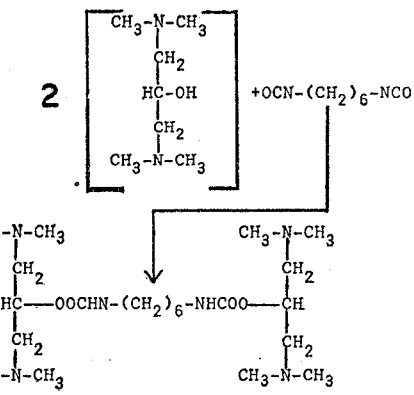

Each hydroxy group joins an isocyanate group to form a urethane linkage. Further reaction with dibromobutane results in quaternization of the nitrogen atoms and chain extension to form a polymer having a repeating unit of the formula:

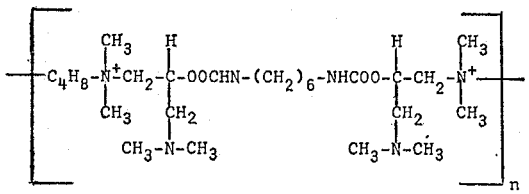

The isocyanate may be aliphatic aromatic, mixtures thereof or may be of polymeric length.

Examples of suitable compounds of this type include benzene-1,3-diisocyanate,
hexane-1,6-diisocyanate,
tolylene-2,4-diisocyanate (TDI),
tolylene-2,3-diisocyanate,
diphenylmethane-4,4'-diisocyanate,
naphthalene 1,5-diisocyanate,
diphenyl-3,3'-dimethyl-4,4'-diisocyanate,
diphenyl-3,3'-dimethoxy-4,4'-diisocyanate diethyl ether,
3-(diethylamino)-pentane-1,5-diisocyanate,
butane-1,4-diisocyanate,
cyclohex-4-ene-1,2-diisocyanate,
benzene-1,3,4-triisocyanate,
naphthalene-1,3,5,7-tetraisocyanate,
naphthalene-1,3,7-triisocyanate,
toluidine-diisocyanate,
isocyanate terminated prepolymers,
polyaryl polyisocyanates, and the like. A suitable commercially available polyaryl polyisocyanate is a polymethylene polyphenyl isocyanate known as PAPI–1 (The Carvin Co.). This material has an average of 3 isocyanate groups per molecule and an average molecular weight of about 380.

Other commercially available higher molecular weight polyisocyanates are Adiprene 100 (Du Pont) an isocyanate terminated polyoxyalkylene glycol having a molecular weight of about 1000, Multrathane-242F (Mobay) a polyester terminated with isocyanate groups and Solithane 113 (Thiokol) which is a triisocyanate derivative of glycerol and ricinoleic acid.

The halo or tertiary amino alcohol may suitably be aliphatic or aromatic such as 1,3-bis-(dimethylamino)-2-propanol, 2-dimethylaminoethanol, bromoethanol, p-dimethylaminophenyl methyl carbinol, p-dimethylaminophenol or, 3-bromo, n-propanol. It is understood that similar products are realized when tertiary amino or bromo substituted isocyanates are reacted with diols or when carboxyl, amino or other reactive functional groups are substituted for the isocyanate or hydroxyl groups on the illustrative compounds discussed above.

The urethane forming step of the synthesis of the prepolymers is preferably conducted in solvent under anhydrous conditions. A diamine is dissolved in solvent and a dihalide is slowly added to the solution with stirring. The polymer forms and may be separated and worked up in numerous ways. For example, the solution may be poured and cast into a sheet by evaporating the solvent. The conductivity of the cationic sheet can be substantially enhanced by treatment with an organic charge-transfer complexing agent such as lithium tetracyanoquinodimethane (LITCNQ), and neutral tetracyanoquinodimethane (TCNQ).

Other specific reaction schemes leading to the cationic viscoelastic polymer of Formula I are presented below.

REACTION 2

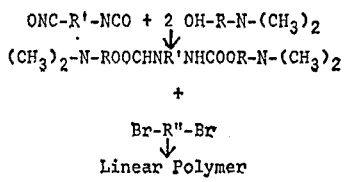

REACTION 3

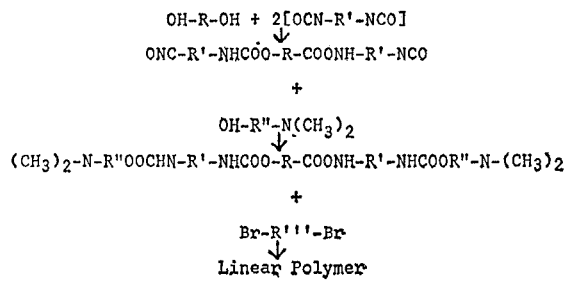

REACTION 4

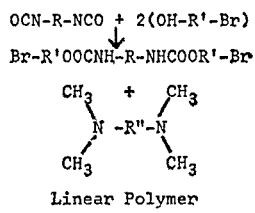

Linear Polymer

REACTION 5

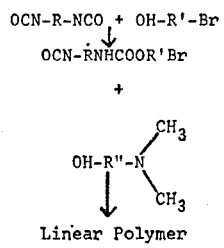

Linear Polymer

REACTION 6

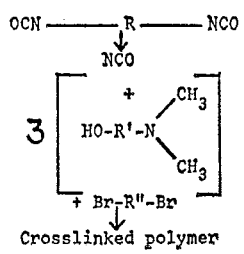

Crosslinked polymer

REACTION 7

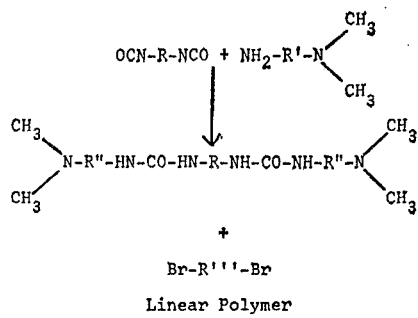

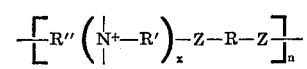

Linear Polymer

Reactions 1, 2, 4, 5, 6 and 7 form a polymer having a repeating unit of the formula:

$$-\left[-R''\left(\underset{|}{N^+}-R'\right)_x-Z-R-Z-\right]_n-$$

where $x$ and $n$ are integers and the groups R, R' and R" are either short or long chain aliphatic or aromatic and are varied in accordance with the desired final properties. The tertiary or quaternary nitrogen atoms may be substituted with groups other than methyl such as other lower alkyl groups, aryl groups such as phenyl, aralkyl groups such as benzyl, alkaryl groups such as tolyl, cycloalkyl such as cyclohexyl or may form a portion of a heterocyclic ring such as pyridyl.

The invention will now become better understood by reference to the following detailed description when considered in conjunction with the accompanying drawings.

Figure 1:
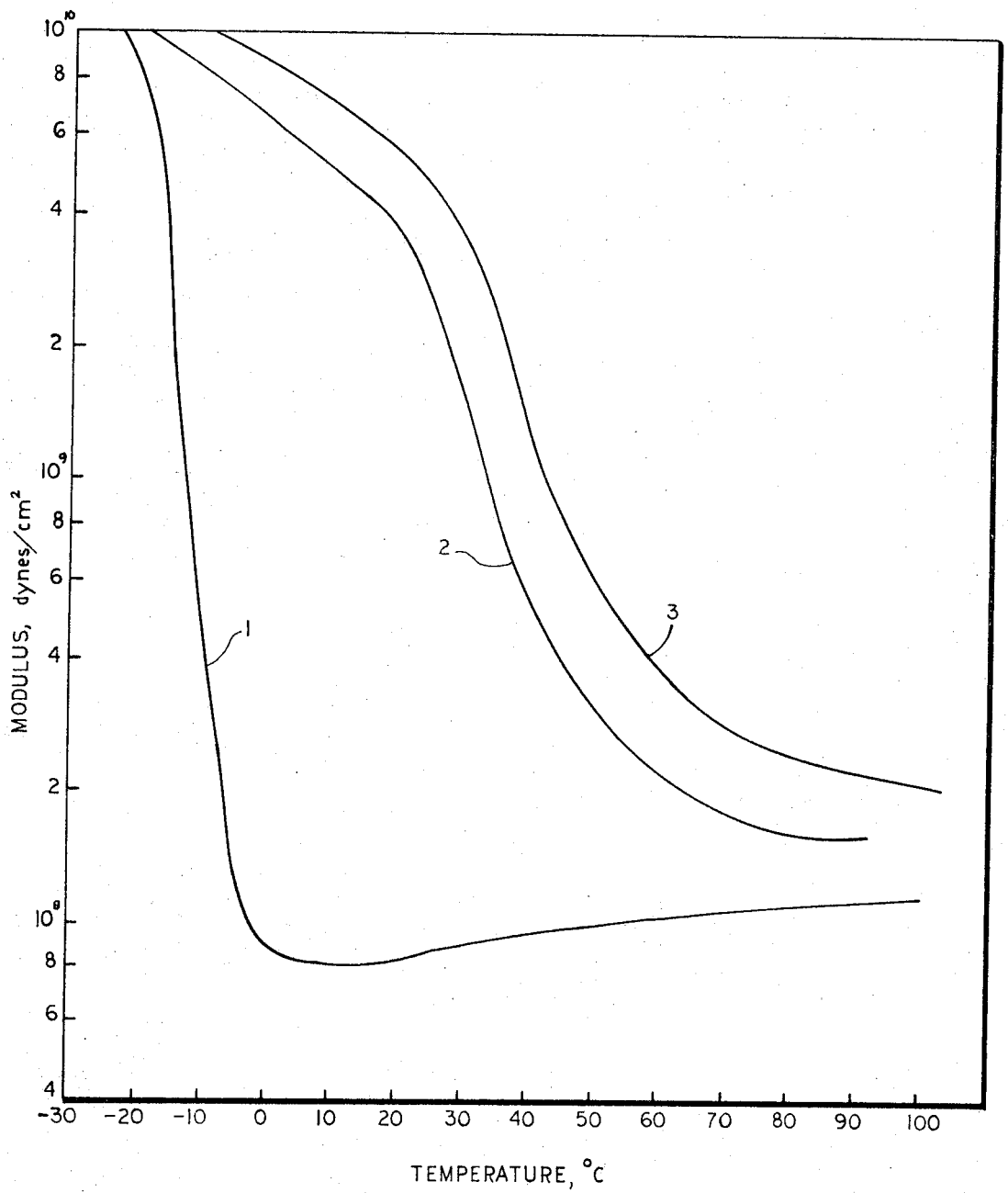
FIG. 1 is a graph of modulus (dynes/cm.$^2$) vs. temperature (° C.) illustrating the effect of cationic groups on the properties of various polymers.

The following examples are offered by way of illustration. It is to be understood that only preferred embodiments of the invention are illustrated, and that numerous substitutions, alterations and modifications are readily apparent to those skilled in the art and are therefore intended to be included within the scope of the invention.

DESCRIPTION OF THE PREFERRED EMBODIMENTS

The following experiments illustrate the effect of molecular weight and cationic center distribution on the properties of the final polymer.

EXAMPLE I

A. Preparation of stock solutions of Solithane-DMAP

Solithane 113 (Thiokol Corporation) containing three isocyanate groups per molecule (290.4 g.) was dissolved in dry benzene (1100 g.). Dry 1,3-bis(dimethylamino)-2-propanol (DMAP–85.2 g.) was added to this solution and the mixture was heated at 50° for 24 hours. The completion of reaction was ascertained by means of infra red spectroscopy. The disappearance of the absorption peak at 4.56µ was utilized to indicate reaction completion.

B. (1) Reaction product of stock solution with dibromopolybutadiene

The stock solution (17.1 g.) was reacted at room temperature with polydibromobutadiene of approximate molecular weight 3500 ( 35 g.) dissolved in benzene (86 g.). The reaction mixture was cast in a Teflon lined mold. The rubber thus obtained after evaporation of solvent and drying showed good damping characteristics (see FIG. 2, Curve 1).

B. (2) Reaction product of stock solution with dibromohexane

The stock solution (51.3 g.) was mixed with 1,6-dibromohexane (7.32) and a film was cast at room temperature. The mechanical properties of the dry and solvent free film are illustrated by the modulus temperature curve shown in FIG. 1, Curve 2.

B. (3) Reaction product of stock solution with dibromopropane

Figure 2:
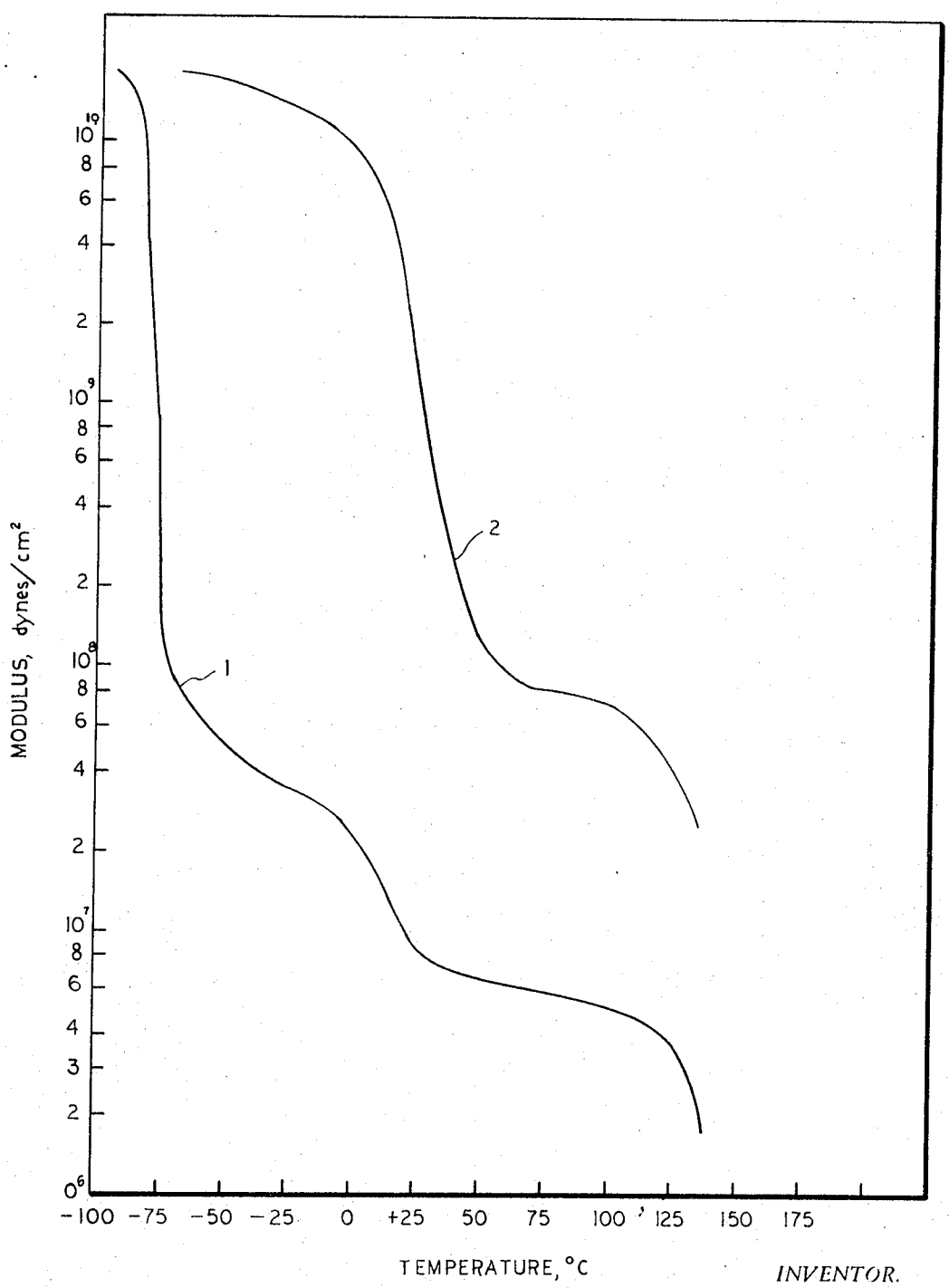
FIG. 2 is also a graph of modulus (dynes/cm.$^2$) vs. temperature (° C.) illustrating the effect of the molecular weight of the dihalo compound on the properties of the polymer.

The stock solution was reacted and isolated in the same way as in (1) but using 1,3-dibromopropane (6.1 g.). The modulus temperature curve is shown in FIG. 2, Curve 2.

B. (4) Reaction product of (2) with TCNQ

The flexible cationic rubber sheet prepared in (2) was treated with Li-TCNQ and neutral TCNQ by boiling the sheet for a few hours with an equimolar quantity of Li-TCNQ and then treating this sheet with boiling neutral TCNQ in acetonitrile solvent. The resulting dark blue colored film was a tough flexible rubbery sheet. The room temperature resistivity was found to be about $1 \times 10^7$ ohm$^{-1}$ cm.$^{-1}$. The modulus of the rubbery product is shown in FIG. 1, Curve 3.

A non-ionic Solithane specimen was obtained by reacting Solithane 113 with castor oil at 200° F. for 12 hours. The modulus of this material is illustrated as Curve 1, FIG. 1. The modulus temperature curves were determined by means of a modified Gehman Tester. The number of ionic links was determined by analysis of ionic bromine. The effect of cationic centers on the glass transition temperature as derived from modulus temperature curves was found to be negligible in the case in which one cationic center is introduced per molecular weight of approximately 2000. However, one quaternary ammonium group per 250 molecular weight segment raised the transition temperature by about 40° C. The transition temperature is raised from about −12° C. for Solithane cured with castor oil to +33° C. for a polymer containing one cationic link per chain segment of 250. This is raised even further when the cationic polymer is complexed with TCNQ. Thus, cationic centers present in the backbone of the polymers at relatively low concentration have a pronounced effect on the mechanical properties of the polymer.

Referring again to FIG. 2, it is also observed that there are large differences in the mechanical behavior of a Solithane 113-tertiary amine polymer crosslinked by means of dibromopolybutadiene as compared to one crosslinked with dibromopropane. The shape of the two curves, that is, the three transition temperatures of (1) and the two transitions of (2), indicate block polymer behavior. The three transitions plateaus of the polybutadiene containing product over such a wide temperature range indicate that the product will have excellent damping characteristics.

EXAMPLE II

A dry benzene solution of dihydroxypropylene glycol of approximate molecular weight of 2000 (100 g. in 50 cc. of benzene) was reacted with toluene diisocyanate (17.5 g. in 15 cc. of benzene) at room temperature. After standing overnight, the mixture was heated to 50° C. for two hours and then heated under reflux for five minutes. After cooling to room temperature, 2-dimethylaminoethanol (DMAE) (8.9 g. in 5 cc. of benzene) was added while stirring. After standing for 48 hours, the reaction mixture was heated to 80° C. for 15 minutes and subsequently cooled to room temperature. At this time 1,6-dibromo hexane in benzene (12.2 g. in 5 cc. of benzene) was added. An immediate increase of viscosity was noted.

The reaction mixture was transferred into a Teflon lined pan and left in a hood. After evaporation of the solvent 110 g. of a transparent rubbery solid was obtained. The product contained 5.7% of ionic bromine and could be molded at 90° C. under pressure.

EXAMPLE III

P-dimethylaminophenol (2.7 g.) was mixed with 22.5 g. of polypropylene glycol diisocyanate (approximate molecular weight, 2200). The mixture was heated for 1 hour at 60° C. and left standing for 24 hours. A portion of the resultant viscous product (11.3 g.) was reacted at room temperature with dibromobutene (1.9 g.) dissolved in benzene (50 cc.). The reaction product was cast on a Teflon sheet. After evaporation of the solvent, a rubbery film was obtained.

EXAMPLE IV

Solithane 113 (145 g.) was intimately mixed with dry 1,3-n-bromopropanol (42 g.). The mixture was heated at 50° C. for two hours and left standing at room temperature for 24 hours. N,N,N',N'-tetramethylaminohexane (25.8 g.) in benzene (100 g.) was then added to the mixture which was made homogeneous by mechanical stirring. The viscous solution was transferred to a Teflon lined pan, placed in a ventilated hood. After 24 hours a transparent, strong rubbery sheet was obtained.

EXAMPLE V

This example illustrates the preparation of a cationic rubber from a low molecular weight isocyanate, a typical dialkyldiamino alcohol and a high molecular weight organic dibromo-compound. About 5.6 grams of hexamethylene di-isocyanate was added slowly with agitation to 9.6 grams of bis-1,3-(dimethylamino)-2-propanol in a flask and allowed to react at room temperature for 24 hours. About 15.2 grams of a viscous reaction product was obtained. A 1.4 gram portion of the purified product was then dissolved in 10 ml. of benzene and to this solution 30 g. of dibromopolybutadiene was then added. The latter organic dibromo compound has a fairly linear backbone, terminal bromine groups and a molecular weight of about 5000. After stirring, the mixture was poured into Teflon lined molds, and allowed to stand and evaporate overnight. The product upon removal from the mold was found to be a translucent, flexible rubbery sheet with a glass transition temperature of about −80° C.

EXAMPLE VI

This example illustrates the preparation of a soluble, non-crosslinked cationic rubbery material. Example I was repeated using stoichiometric amounts of polypropylene glycol di-isocyanate and 2-dimethylaminoethanol in benzene solution. After eight hours standing, a roughly equimolar quantity of 1,4-dibromobutene was added directly to the benzene solution with agitation. Evaporation of the solvent in a Teflon lined tray gave a transparent rubbery sheet.

EXAMPLE VII

Example V was repeated using commercially available toluene di-isocyanate (TDI) and the same tetramethyl diamino alcohol and dibromopolybutadiene. A rubbery film was obtained from benzene or chloroform solutions.

EXAMPLE VIII

Two moles of 2-dimethylaminoethanol (DMAE) were reacted with one mole of PAPI to form a DMAE/PAPI adduct having a molecular weight of 222.6. 5.3 grams of a 50% benzene solution of DMAE/PAPI (0.012 mole) were thoroughly mixed with a mixture of 30 grams of dibromopolybutadiene (0.006 mole) in 45 grams of benzene. The so formed solution was poured into a teflonized pan and left for evaporation in a well ventilated room for 24 hours and then at room temperature in a dry box for a week. 31 grams of polymer was recovered in the form of a yellow-gray rubber sheet having a shiny, slightly krinkled surface. The product had good elasticity and a melting point of 190° C.

EXAMPLE IX

Two moles of 1,3-bis-(dimethylamino)-2-propanol (DMAP) were mixed with 1 mole of Multrathane 242F to form a ditertiary amine adduct having a molecular weight of 1584. 9.5 grams of a 50% benzene solution of the adduct (0.003 mole) were thoroughly mixed with a solution of 30 grams of a 5000 molecular weight dibromopolybutadiene (0.006 mole) in 30 grams of chloroform. The so formed solution was poured into a Teflon lined pan and left for evaporation in a well ventilated room. The yield was 32 grams of rubber with a non-krinkled shiny surface. The product was non-sticky and elastic and discolors by 180° C. without losing its shape. In a second batch the chloroform content was doubled and the air bubbles in the produce decreased but the krinkling of the surface increased.

EXAMPLE X

A tetra-tertiary amine prepolymer was synthesized from 1 mole of hexamethylene diisocyanate and two moles of DMAP. 1.4 grams or 0.003 mole of the prepolymer were carefully mixed with 8.5 mls. of benzene. This solution was then thoroughly mixed with a solution of 30 grams (0.006 mole) of Polysar rubber (5,000 molecular weight dibromopolybutadiene) in 60 ml. of benzene. The so formed solution was poured into a Teflon lined pan and left for evaporation in a well ventilated room for 48 hours. The final yield was 32 grams of a rubbery yellow-gray sheet 21 x 10.5 x 0.2–0.5 cm.$^3$. The product was non-sticky and had a shiny surface. The sheet was elastic and had a softening point above 165° C.

EXAMPLE XI

A. Preparation of PAPI–DMAP stock solution

The synthesis was carried out under extremely dry conditions. 15.0 grams of PAPI dissolved in 33 ml. of dry benzene were added under agitation in a fine stream to 18.0 grams (a 10% molecular excess) of 1,3-bis(dimethylamino)-2-propanol (DMAP). An immediate exothermic reaction was evidenced. The reaction mixture was agitated at room temperature for 72 hours. The reaction product was recovered by pouring the brown viscous mixture into 18 ml. of petroleum ether while rapidly agitating the ether. The residue was washed in 200 ml. of petroleum ether. The final washed product was dried in a desiccator and yield was 29 grams.

B. Polymerization with dibromopolybutadiene 1.7 grams of PAPI–DMAP (0.006 mole) dissolved in 8.5 ml. of benzene were thoroughly mixed with a solution of 30 grams of Polysar (dibromobutadiene-5,000 M.W.) in 60 ml. of benzene. The so formed solution was poured into a Teflon lined pan and left for evaporation in a well ventilated room for 30 hours. 31 grams of a yellow-gray rubbery sheet were recovered. The sheet had a non-sticky shiny surface. The softening point was above 180° C.

C. Polymerization with dibromopropane 6.2 grams (0.02 mole) of PAPI/DMAP dissolved in 25 mls. of a 1/1 acetone-DMF mixture were quickly added under agitation to 4.1 grams (0.02 mole plus 3% excess). No immediate reaction of 1,3-dibromopropanol took place. Agitation at room temperature for 24 hours rendered the mixture cloudy. Homogenous rubber resin conglomerates were precipitated in petroleum ether. Final yield was 12 grams after drying in a desiccator. The product was a yellow-gray, non-sticky elastomer which discolored to a golden brown above 185° C.

D. Polymerization with 1,6-dibromohexane 6.2 grams (0.02 mole) of PAPI/DMAP dissolved in 25 mls. of 1/1 acetone-DMF mixture were quickly added under agitation to 5.0 grams (0.02 mole plus 3% excess) of 1,6-dibromohexane. No immediate reaction was seen. Agitation at room temperature for 24 hours plus storage for 72 hours gave no observable change. The reaction mixture was transferred to teflonized dishes for evaporation of solvent in well ventilated rooms. Final product was in the form of yellow-brown, non-elastic particles. Product does not melt or soften below 205° C. and discolored towards a golden brown from above 180° C.

EXAMPLE XII 50 grams (0.01 mole) of the reaction product of 2 moles of DMAP and one mole of toluene di-isocyanate (TDI) were thoroughly mixed with 100 grams of CCl$_4$. 4.7 grams (0.01 mole of a suspension of polydibromobutadiene (5,000 M.W.) was added to the resulting viscous liquid with agitation. Slow agitation was continued for five minutes and an almost clear liquid resulted, the few bubbles that formed disappearing after several minutes. The reaction mixture was then carefully transferred into polyethylene pans. After evaporation of the solvent for 48 hours, the material was removed from the pan and drying continued for 24 hours. A brownish, almost opaque rubber sheet was obtained. The sheet was elastic, bubble free, non-sticky and had a smooth dull surface.

The reaction was repeated utilizing 75 grams (0.015 mole) of polydibromobutadiene in 150 grams of CCl$_4$ and 7.0 grams of the TDI–DMAP complex in 148 grams of CCl$_4$. Ten rubber sheets approximately 10 by 20 cm. and 18 by 18 cm. were obtained.

EXAMPLE XIII

A. Preparation of an addition compound with hexane diisocyanate 5.0 grams (0.03 mole) of 1,6-diisocyanatohexane was carefully mixed with 9.0 grams (0.06 mole plus 3% excess) 1,3-bis-(dimethylamino-2-propanol (DMAP). No exotherm was evidenced and agitation was continued overnight. A gray-white very viscous, homogeneous liquid was obtained with crystalline particles separating after two weeks.

B. Polymerization of A with polydibromobutadiene 25 grams (0.005 mole) of polydibromobutadiene (5,000 M.W.) were mixed into 75 grams CCl$_4$. A mixture of 1.2 grams (0.0025 mole) of the adduct from A in 23 grams of CCl$_4$ was added to the adduct mixture while stirring. The resulting, slightly viscous mixture was left standing, covered for several minutes in order to let bubbles disappear and then carefully transferred into a polyethylene pan. Solvent was evaporated at room temperature for 72 hours. 25 grams of a golden brown, clear, thick rubber sheet 8 x 8 cm. with good elasticity and a shiny, smooth, bubble free surface was obtained.

EXAMPLE XIV

A. Multrathane-DMAP addition compound

The synthesis was again conducted under extremely dry conditions 25.8 grams of Multrathane 242F (0.02 mole) was mixed with a magnetic stirrer bar until a gray-white, opaque homogeneous mixture was obtained. While agitation continued, a mixture of 6.0 grams of DMAP (0.04 mole plus 3% excess) in excess 5.6 grams of dried benzene was added in one portion. A small further amount of dry benzene was added when increased viscosity made agitation difficult. The reaction was not exothermic.

B. Polymerization with polydibromobutadiene 10 grams of polydibromobutadiene (0.002 mole) was mixed with 6.4 grams of a 50% benzene solution of A (0.002 mole) in a polyethylene pan. The resulting very viscous and homogeneous liquid was spread in a thin layer over the pan. The solvent was evaporated at room temperature over one week. 12 grams of an 8 cm. by 8 cm. thin rubber sheet was obtained.

The following example demonstrates the effect of proportions on the properties of the final product.

EXAMPLE XV 25.8 grams of Multrathane 242F (0.02 mole) were mixed with 25.8 grams of dry benzene under extremely dry conditions resulting in a homogeneous mixture which was stirred for 16 hours until a viscous, grayish-white, opaque liquid was obtained. The liquid was then added drop-wise with stirring into a mixture of 6.0 g. of 1,3-bis-(dimethylamino)-2-propanol (0.04 mole plus 3% excess) in 5.6 g. of dry benzene. No spontaneous reaction took place. Agitation was continued at room temperature for 16 hours with a slight resultant increase in viscosity. The mixture was diluted with 100 g. of benzene and added in a fine stream under agitation to a mixture of 100 g. of polydibromobutadiene (5,000 molecular weight-0.02 mole) in 35 g. of benzene.

In order to let the bubbles formed by the mixture escape the material was left covered for approximately 1 hour during which time reaction took place. The mixture became so viscous that it was impossible to transfer the contents of the beaker into the glass pans without bubble formation, the material stiffening almost immediately. The covered pans were left at room temperature for evaporation of the solvent for 16 hours. Beige colored 0.2 cm. thick rubber sheets were obtained. The sheets were non-sticky, elastic, and had a shiny surface. The product starts to soften at 160°.

When the molar ratio of the Multrathane-DMAP-polydibromobutadiene was changed from 1:2:2 as above to 1:2:1 under the same conditions the softening point was reduced to 100° C. and the product had poor elasticity.

The following example illustrates the preparation of a prepolymer based on a polyoxyethylene polyether terminated with isocyanate groups and the resultant polymer formed by reaction with a dibromo compound. The particular prepolymer utilized was Adiprene L–100 containing 4.1% isocyanate groups and having a molecular weight of 1,024.

EXAMPLE XVI 25.6 g. of Adiprene L–100 (0.025 mole) were mixed with 25.6 g. of dried benzene. The resultant fairly viscous liquid was added drop-wise, under stirring to a solution of 3.8 g. of DMAP (0.025 mole plus 3%) in 3.6 g. of dry benzene. No spontaneous reaction took place. Agitation at room temperature was continued for 16 hours. Only a slight increase in viscosity was observed. 14 g. of this 50% benzene solution (0.06 mole) was added under stirring to a solution of 30 g. of dibromopolybutadiene (5,000 molecular weight-0.06 mole) in 60 grams of chloroform. After five minutes the bubbles had disappeared. No visible changes were observed. The colorless-clear fairly viscous liquid was then carefully poured into a glass pan and the bubbles formed by pouring eliminated with a spatula. The solvent was evaporated under a hood at ambient temperature for 48 hours. The final product was a clear-light yellow sheet approximately 0.5 cm. thick, exhibiting good elasticity. The product had a shiny and smooth surface and become brownish-golden and softening at 185° C.

EXAMPLE XVII

Under extremely dry conditions Adiprene L–167 was reacted with DMAP. Adiprene L–167 has a molecular weight of about 662 based on an isocyanate content of 6.35%. 33 g. of Adiprene-L–167 (0.05 mole) were mixed with 33 g. of dry benzene. The resulting, fairly viscous liquid was added dropwise under stirring to a solution of 7.5 g. of DMAP (0.05 mole plus 3% excess) in 7.1 g. of dry benzene. No spontaneous reaction was evident. Agitation was continued for 16 hours at ambient temperature. A slight change of viscosity was observed. The product was a 50% solution in benzene.

30 g. (0.006 mole) of polydibromobutadiene having a molecular weight of 5,000 were dissolved in 60 g. of chloroform. Into this solution was then added under stirring 9.7 g. of the 50% solution in benzene described above (0.06 mole). The mixture was kept covered until bubbles had disappeared which required about 5 minutes. No visible changes were observed. The almost clear, colorless fairly viscous liquid was then slowly poured into a glass pan and the bubbles formed by pouring, eliminated with the aid of a spatula. The mixture soon stiffened. The solvent was evporated under a hood at ambient temperature for 48 hours. The final product was a clear, light yellow sheet about 0.5 cm. thick and was rubbery, elastic, shiny and smooth. The product began to turn brown and soften at 175° C.

EXAMPLE XVIII

One mole of Solithane 113 (Thiokol Co.) dissolved in dry benzene (30% solution by weight) was reacted with 3 moles of bis-1,3-dimethylamino-2-propanol at 50° C. for 12 hours. The rate of reaction was followed by infra red spectrophotometry. At the end of this time the solution was mixed with 3 moles of dibromopolybutadiene of approximate molecular weight 5,000 dissolved in 3,000 ml. of benzene. The mixture was poured into a Teflon coated mold. After evaporation of benzene a rubbery sheet was obtained.

EXAMPLE XIX

A. Synthesis of diisocyanate prepolymer

Dihydroxy polypropylene glycol of approximate molecular weight 2,000 was reacted with comercial toluene diisocyanate (49.07 g.) at 60° C. for 26 hours to form a viscous liquid.

The completion of reaction was established by infra red spectrophotometry (disappearance of absorption peak at 2.9 microns).

B. Conversion of A to a tertiary amine prepolymer 46.96 grams of the viscous liquid obtained as described in I were heated with bis-1,3-dimethylamino-2-propanol (5.48 g.) at 60° C. for two hours. The rate of reaction was followed by observing the disappearance of absorption peak at 4.4 microns. The resulting reaction product is a colorless viscous liquid.

C. Copolymerization of B with dibromobutene

The reaction product obtained as described above (6.6 g.) was intimately mixed with 1,4-dibromobutene (0.93 g. in 50 ml. of benzene) and the mixture was placed in a shallow mold. A transparent colorless film was formed within 15 minutes. The rubbery film was dried in a vacuum oven at room temperature for 24 hours. It exhibited strong birefringence between an analyzer and polarizer.

D. Copolymerization with dibromoprepolymer

Solithane 113 (1 mole) was intimately mixed with 3-bromo-n-propanol (3 moles) and kept at 60° C. for 24 hours. The rate of reaction was followed by I.R. The reaction product is a viscous yellow liquid at 60° C. The viscous yellow liquid obtained (19.4 g.) was intimately mixed with the liquid obtained as described in B (13.2 g.) and with benzene (100 ml.) The solvent was evaporated in a hood and the residue on heating at 50° C. for 5 hours yielded a rubbery film.

E. Complexing D with TCNQ 1 cm.$^2$ of this film was immersed in a methanol solution of lithium tetracyano quinodimethane (0.1% by weight). The resulting dark colored film after drying had a resistivity equal to $5 \times 10^6$ ohm cm.

F. Reaction of D with heparin 1 cm.$^2$ of the same film was kept for 2 hours in a methanol-tetrahydrofuran-water solution of sodium heparin (2% by weight) (solvents in proportion 45:45:1). The film after thorough washing with water contained heparin as evidenced by means of a dye (Azure A) test.

G. The product obtained as described in B (6.6 g.) was intimately mixed with m-dibromoxylene (1.32 g. in 50 ml. of benzene). A clear transparent film cast was formed in the hood within 15 minutes.

H. The product obtained as described in A (112.5 g.) was intimately mixed with 2-dimethylamino ethanol (8.55 g.) and heated at 60° C. for 17 hours. The rate of reaction was followed by means of I.R. The reaction product is a clear viscous liquid.

I. The reaction product obtained as described in H (12.63 g.) was intimately mixed with 1,3-dibromo propane (1.48 g. in 100 cc. of benzene) in a Teflon lined mold. After slow evaporation of solvent, the mixture was heated at 60° C. for 5 hours. A benzene soluble rubbery transparent sheet was obtained.

J. The reaction product obtained as described in H (0.005 mole) dissolved in 30 ml. benzene was intimately mixed with 1,4-dibromobutene (0.005 mole in 20 ml. of benzene). The mixture was poured into a Teflon coated mold. After evaporation of solvent and drying, a transparent rubbery film was obtained. The film was soluble in methanol, tetrahydrofuran and acetone. The film was dissolved in acetone and reprecipitated with n-hexane. The dry polymer could be molded under pressure at 50–100° C. to give a desired shape.

K. The polymer (1 g.) obtained as described in Example J was dissolved in methanol (100 cc.) was mixed with sodium heparin (0.29 g. in 20 ml. methanol/water, 1:1 mixture). The white precipitate which formed was washed with water four times in order to remove unreacted heparin and sodium bromide. The product was subsequently washed with methanol three times. The heparinized polymer swelled in acetone yielding a transparent gel. The dry heparinized polymer is slightly soluble in tetrahydrofuran and gives a very pronounced positive Azure A test.

The cationic viscoelastic materials of the invention having a wide damping temperature range from about $-100°$ C. to about 150° C., will find ready use in aircraft parts which quite often encounter such temperature extremes during service. The glycol based materials are found to be hydrophilic. Thus the materials of the invention combine the properties and advantages of the cationic centers with elastomeric physical behavior further in combination with birefringence, hydrophilicity and other useful effects. The cationic centers can also function as attachment sites to substrates such as a rocket motor case propellant particles and in general to negatively charged surfaces.

The elastomers of the invention can include various fillers, dyes or pigments well known in the art and further improvement in properties can be expected. The viscoelastic materials can be utilized to mold, coat, extrude or otherwise form articles in film, sheet or other configurations. The unique combination of properties will provide many new areas of utilization for elastomeric materials.

It is to be realized that only preferred embodiments of the invention have been disclosed and that numerous substitutions, alterations and modifications are permissible without departing from the scope of the invention as defined in the following claims.

What is claimed is:

1. A viscoelastic cationic polymer of the formula:

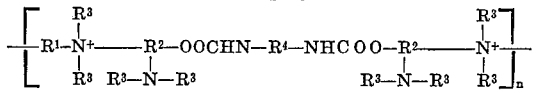

where $R^1$ is a polybutadiene having a molecular weight from 3,000 to 5,000, $R^2$ is lower alkyl, $R^3$ is lower alkyl, $R^4$ is selected from phenyl, polyphenyl, polyoxyethylene and alkyl of 4–20 carbon atoms and $n$ is an integer from 2 to 500.

2. A polymer according to claim 1 in which $R^3$ is methyl.

3. A polymer according to claim 2 in which $R^2$ is propyl.

4. A polymer according to claim 2 in which $R^1$ is a polybutadiene containing less than 40% 1,2-addition units.

5. A polymer according to claim 1 complexed with tetracyanoquinodimethane.

6. A polymer having a repeating unit of the formula:

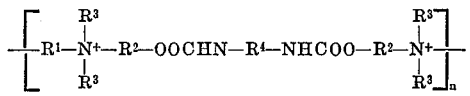

where $R^1$ is polybutadiene having a molecular weight from 1,000 to 10,000, $R^3$ is lower alkyl, $R^2$ is lower alkyl, $R^4$ is selected from phenyl, polyphenyl, polyoxyethylene and alkyl of 4–20 carbon atoms and $n$ is an integer from 2 to 500.

7. A polymer according to claim 6 in which $R^3$ is methyl.

8. A polymer according to claim 6 in which $R^2$ is ethyl.

9. A polymer according to claim 6 complexed with tetracyanoquinodimethane.

10. A method of forming a cationic, viscoelastic polymer comprising the steps of:
reacting at least two moles of tertiary amino alkanol with a diisocyanate in solvent under anhydrous conditions to form a polytertiary amine of the formula:

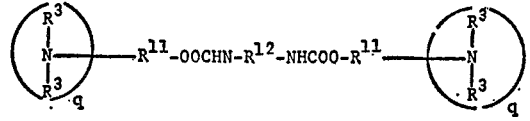

where $R^3$ is lower alkyl; $R^{11}$ is alkyl of 1 to 10 carbon atoms; $R^{12}$ is selected from alkyl of 4–20 carbon atoms, phenyl and polyoxyethylene and $q$ is an integer from 1 to 2;

dissolving the polytertiary amine in solvent and slowly adding to the solution a dibromopolybutadiene having a molecular weight from 1,000 to 10,000 to form a solid elastomeric, polyquaternary material of the formula:

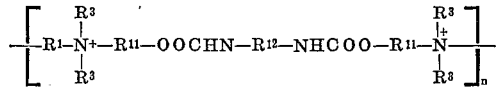

where $R^1$ is polybutadiene and $n$ is an integer from 2–500; and
reacting said material with tetracyanoquinodimethane to form a complex having a higher conductivity than said material.

11. A method according to claim 10 in which the alkanol is selected from 1,3-bis-(dimethylamino)-2-propanol and 2-dimethylaminoethanol.

References Cited

UNITED STATES PATENTS

| | | | |
|---|---|---|---|
| 2,955,108 | 10/1960 | Omietanski | 260—205 |
| 3,036,998 | 5/1962 | Rudner | 260—775 |
| 3,294,752 | 12/1966 | Wilkinson | 260—77.5 |
| 3,321,415 | 5/1967 | Hennig et al. | 260—2.5 |
| 3,388,087 | 6/1968 | Dieterich et al. | 260—29.2 |
| 3,395,129 | 7/1968 | Dieterich et al. | 260—77.5 |
| 3,397,184 | 8/1968 | Heydkamp et al. | 260—77.5 |
| 3,415,768 | 12/1968 | Dieterich et al. | 260—29.2 |

FOREIGN PATENTS

| | | | |
|---|---|---|---|
| 912,491 | 12/1962 | Great Britain | 260—77.5 |
| 1,006,151 | 9/1965 | Great Britain | 260—77.5 |

MAURICE J. WELSH, Primary Examiner

M. I. MARQUIS, Assistant Examiner

U.S. Cl. X.R.

117—6, 138.8 R; 260—33.6 UB, 33.8 UB, 37 N, 41 R, 77.5 AQ, 77.5 CH, 94.9 N, 859 R